(No Model.)
W. K. HOAGLAND.
HARROW.
No. 471,384.  Patented Mar. 22, 1892.
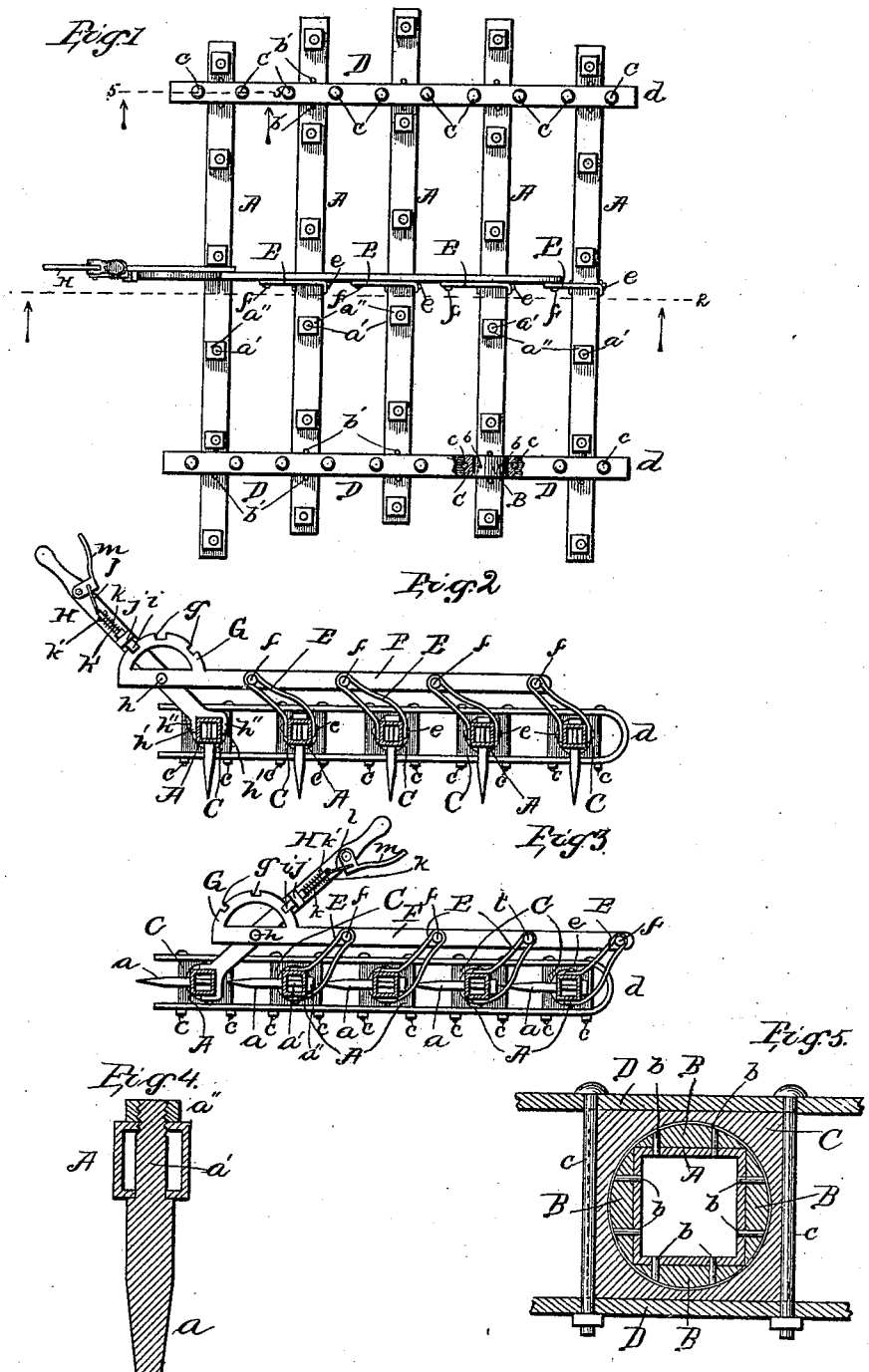
Witnesses.
Wm. M. Rheem
J. R. Andrews
Inventor.
William K. Hoagland

UNITED STATES PATENT OFFICE.

WILLIAM K. HOAGLAND, OF PERU, ILLINOIS.

HARROW.

SPECIFICATION forming part of Letters Patent No. 471,384, dated March 22, 1892.

Application filed January 14, 1890. Serial No. 336,946. (No model.)

*To all whom it may concern:*

Be it known that I, WILLIAM K. HOAGLAND, a citizen of the United States, residing at Peru, in the county of La Salle and State of Illinois, have invented certain new and useful Improvements in Harrows; and I do hereby declare that the following is a full, clear, and exact description of the invention, which will enable others skilled in the art to which it pertains to make and use the same, reference being had to the accompanying drawings, forming a part hereof, in which—

Figure 1 is a top or plan view. Fig. 2 is a sectional elevation showing the teeth standing vertical in working position. Fig. 3 is a sectional elevation showing the teeth turned back and out of use. Fig. 4 is a cross-section of the hollow square tooth-bar, showing also a tooth in section. Fig. 5 is a detail in section showing the mounting of the tooth-bars in bearings, so as to turn.

This invention relates to harrows of that class in which the tooth-bars are mounted so as to be capable of turning to set the teeth at different inclinations to perform different kinds of work; and the object is to construct such harrow so that it will be light and at the same time strong and durable; to improve the means for hanging the tooth-bars, and to improve generally the construction and operation of the harrow as a whole; and its nature consists in providing tooth-bars made of a hollow square pipe, in which the teeth are secured by a screw-threaded shank and a nut or in some other suitable manner; in providing bearing-blocks attached one to each side of the tooth-bars and fitting a box for mounting each tooth-bar so as to turn freely, and in the several parts and combination of parts hereinafter described, and pointed out in the claims as new.

In the drawings, A represents the tooth-bars. Each bar is formed of a hollow square metal tube, and is rectangular in cross-section. Each bar is provided with a series of holes to receive the shanks $a'$ of the teeth $a$, and, as shown, the shank of each tooth is round and has at its end a screw-thread to receive a nut $a''$, and at the base of the shank $a'$ is a square shoulder on the tooth $a$, which can be drawn snugly against the side of the bar A by the nut $a''$, as shown in Fig. 4, and thereby firmly lock the tooth to the bar, and by using a round shank $a'$ each tooth can be set for its corner to stand in line with the travel of the harrow or otherwise, and in case the corner of the tooth becomes worn the nut $a''$ can be loosened and the tooth $a$ turned to bring another corner into use, and when turned the tooth is locked by setting down the nut $a''$ and drawing the shoulder of the tooth $a$ against the bar A.

B are bearing-blocks, one for each side or face of each tooth-bar A, and attached to the sides or faces of the bar A by pins $b$ or in any other suitable manner, so as to form, when attached, a complete circle, as shown in Fig. 5. A set of these blocks B is used at each end of each tooth-bar A, and if desired such blocks can be used intermediate of the ends for long tooth-bars.

C are blocks, each having a circular hole corresponding in diameter to the circle of the blocks B, so that the blocks C form boxes for mounting the blocks B in, so as to allow the tooth-bars A to turn, a block C being provided for each series or set of blocks B.

D are the supporting-bars, one for the top and one for the bottom, and between which are secured the blocks C, which blocks C are held in place by bolts $c$, one on each side of each block C, and passing through the bars D and the edge of the block C, as shown in Fig. 5. As shown, a bar D is provided for each end of the harrow, and each bar D is formed by turning the bar on itself to form the upper and lower portions and a loop $d$ at the forward end for the attachment of a draft-bar, (not shown,) and if desired for a long harrow a center bar D can be provided.

E are the adjusting-bar-connecting arms for attaching the tooth-beams to the adjusting-bar. An arm E is provided for each tooth-bar, attached to the tooth-bar by bolts or rivets $e$. Each arm E is formed by bending a strap of metal on itself to form two portions, as shown in Figs. 2 and 3, with an eye at the upper end and having its lower or open end straddle the tooth-bar.

F is the adjusting-bar, to which the arms E are connected by pins or pivots $f$, a pin or pivot entering the eye of each arm E, so that the bar F is mounted on and held by the arms E. An arm E, connected to the bar F, is provided for each tooth-bar A except the rear one.

G is a segmental rack formed with or attached to the adjusting-bar F and having a series of notches $g$.

H is the adjusting-lever, connected to the rear end of the adjusting-bar F by a pin or pivot $h$ and having at its lower end a fork $h'$ to receive the rear tooth-bar A, to which the fork is attached by bolts or rivets $h''$, as shown in Figs. 2 and 3. The lever H carries a sliding bolt $i$, held in place by a strap or loop $j$ and having a stem $k$, around which is a coil-spring $k'$, one end of which rests against the end of the bolt $i$ and the other against a guide $k''$, through which the stem $k$ passes. The upper end of the stem $k$ has connected thereto a link $l$, the other end of which is attached to an L-lever $m$, pivoted to the lever H, so that by drawing the lever $m$ toward the lever H the bolt $i$ will be raised and disengaged from a notch $g$, allowing the lever H to be moved to adjust the tooth-bars A, and when adjusted the lever $m$ is released, causing the spring $k'$ to throw the bolt $i$ into engagement with a notch $g$, or the lever $m$ can be released before the notch $g$ is reached, so that the bolt $i$ will enter the notch $g$ by the action of the spring $k'$.

The teeth $a$ are secured in each tooth-bar A, and the blocks B are attached to the ends of the tooth-bar A. The blocks C are slipped over the blocks B and entered between the upper and lower portions of the bars D and there secured by the bolts $c$. The arms E are attached one to each tooth-bar A, except the last or rear bar A. The adjusting-bar F is connected with each arm E, and the adjusting-lever H, with its locking-bolt $i$ and the operating devices therefor, is pivoted to the adjusting-bar F and attached to the rear tooth-bar A, and when brought together, as described, the harrow is ready for use.

In use the operator, by moving the lever H back for the bolt $i$ to enter the rear notch $g$, turns the tooth-bars A for the teeth $a$ to stand vertical, as shown, in which position the harrow will be a breaking one, and in moving the lever H back the lever itself turns the rear tooth-bar A, and the other bars A are turned through the backward movement of the adjusting-bar F and connecting-arms E. The moving of the lever H forward for the bolt $i$ to enter the middle notch $g$ turns the tooth-bars A for the teeth $a$ to have a rearward incline, in which position the harrow becomes a smoothing-harrow. The moving of the lever H forward for the bolt $i$ to enter the forward notch $g$ turns the tooth-bars A for the teeth $a$ to stand horizontal and out of use, and in this position the harrow can be readily moved from place to place, the bars D serving as runners, and with the teeth $a$ standing horizontal the harrow then becomes a clod or lump breaker or crusher through the forward edge of each tooth-bar striking the clods or lumps and breaking them up.

The hollow rectangular metal tooth-bar can be made of very light material and be very strong, and such bar will furnish a firm support for the teeth, as the square face of the bar on one side gives a bearing-face for the entire shoulder of the tooth, and on the opposite side the square face of the bar furnishes a full bearing-face for the nut, so that the tooth can be drawn to place and be firmly clamped. The square metal bar also furnishes a sharp corner edge to act as a clod or lump crusher or breaker, and these bars are much lighter than a square wooden bar, and much stronger, and can be made of a smaller size in cross-section, so that the harrow will be much lighter than a wooden harrow and still be as strong and more durable.

The blocks B, attached to the tooth-bar, furnish a circular face for turning the bar, and these blocks B, in connection with the blocks C, mount the tooth-bars, so as to be capable of easy and quick turning to adjust the teeth to any desired position by simply moving the adjusting-lever, and as these blocks B are secured to the outer faces of the bars A the bars are not weakened thereby, as would be the case if the bars were made round, and by using these blocks B the bars A can be made of thinner metal.

The adjusting-arms E and adjusting-bar F, in connection with the lever H, furnish a positive means for turning the tooth-bars by moving the lever H, and the arms E are very simple in construction and at the same time well adapted for the purpose, as the open end receives the tooth-bar and the eye at the closed end receives the pin or pivot of the adjusting-bar.

The blocks B can be set at different points in relation to the ends of the tooth-bars, so that when the tooth-bars A are mounted in the bars D they will be in different relations one to the other, as shown in Fig. 1, bringing the teeth $a$ out of line, and so that the teeth will not follow each other in a straight draw of the harrow; or the blocks B can be located at the same distance from the ends of the tooth-bars A, in which case the hitch can be made at one corner to give the harrow a diagonal draw. The blocks B are held in place in the blocks C in any suitable manner that will not interfere with a free turning of the blocks B. As shown, a pin $b'$ is located in each side of the bars D, passing through the tooth-bar A, by which pins the blocks B are held in place in the blocks C and endwise movement of the tooth-bars is prevented.

What I claim as new, and desire to secure by Letters Patent, is—

1. In a harrow, a hollow metal tooth-bar formed of a single united piece rectangular in cross-section and carrying the harrow-teeth secured therein, and four segmental journal-blocks B, secured one block to each side of the tooth-bar at the ends of such bar and each block having a circular outer face, in combination with the continuous bearing-blocks C, each having a circular hole for receiving the journal formed by the blocks B and entirely inclosing and forming a protection for such journal, and stops on the tooth-bar each side of the bearing-blocks and engaging such blocks and holding the tooth-bar against end-play without interfering with the turning of the bar on its journals, substantially as and for the purposes specified.

2. In a harrow, a hollow metal tooth-bar formed from a single united piece rectangular in cross-section and carrying the harrow-teeth secured therein, the four segmental journal-blocks B, one secured to each side of a tooth-bar at the ends thereof and each block having a circular outer face, in combination with the continuous bearing-blocks C, having the circular hole wholly receiving the journal formed by the blocks B and entirely inclosing and forming a protection for such journal, and the supporting-bars D, formed of an upper and lower portion, with an open space between them receiving the bearing-blocks C, and retaining-bolts c, locking the bearing-blocks in position between the parts of the supporting-bar and holding the parts of the bar rigid and firm, substantially as and for the purposes specified.

3. In a harrow, the hollow tooth-bar A, formed from a single united piece rectangular in cross-section and carrying the harrow-teeth secured therein, the four segmental journal-blocks B, each having a circular outer face and united one block to each side of the tooth-bar A at each end thereof, the continuous bearing-blocks C, each having a hole wholly receiving one of the journals formed by the blocks B and entirely inclosing and protecting such journal, the supporting-bars D, formed of an upper and lower portion, with an open space receiving the blocks C between them, and retaining-bolts c, locking the blocks C in position and holding the parts of the supporting-bars together, in combination with the arms E, each formed of a metal strap bent on itself to have a pivoting-eye at its outer end and an open receiving-jaw for the tooth-bar at the inner end and secured one arm to the front and to each intermediate tooth-bar, the adjusting-bar F, pivoted to the outer ends of the arms E by pivots entering the eyes of such arms, and the adjusting-lever H, pivoted to the rear end of the adjusting-bar and having at its lower end an open jaw for receiving the rear tooth-bar, substantially as and for the purposes specified.

4. The combination, in a harrow, of hollow metallic tooth-bars A, each formed from a single united piece rectangular in cross-section, the four segmental journal-blocks B at each end of each tooth-bar, the continuous bearing-blocks C, receiving and protecting the journal-blocks B, the supporting-bars D, formed of an upper and lower portion, with an open space receiving the bearing-blocks C, and retaining-bolts c, holding the bearing-blocks in position and locking the bearing-blocks and the supporting-bars one to the other for strengthening the bars, substantially as and for the purposes specified.

WILLIAM K. HOAGLAND.

Witnesses:
O. W. BOND,
J. R. ANDREWS.